United States Patent
Newstadt et al.

(10) Patent No.: US 8,762,312 B1
(45) Date of Patent: Jun. 24, 2014

(54) USING SENTIMENT-BASED ANALYSIS IN THE FILTERING OF WEB CONTENT

(75) Inventors: Keith Newstadt, Newton, MA (US); Adam Schepis, Milford, MA (US)

(73) Assignee: Symantec Corporation, Mountain View, CA (US)

( * ) Notice: Subject to any disclaimer, the term of this patent is extended or adjusted under 35 U.S.C. 154(b) by 653 days.

(21) Appl. No.: 12/560,378

(22) Filed: Sep. 15, 2009

(51) Int. Cl.
*G06F 17/00* (2006.01)
*G06N 5/02* (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| | | | | |
|---|---|---|---|---|
| 5,987,606 | A * | 11/1999 | Cirasole et al. | 726/11 |
| 2008/0154883 | A1* | 6/2008 | Chowdhury et al. | 707/5 |
| 2009/0064302 | A1* | 3/2009 | Colella | 726/9 |
| 2009/0125371 | A1* | 5/2009 | Neylon et al. | 705/10 |
| 2010/0169159 | A1* | 7/2010 | Rose et al. | 705/10 |

OTHER PUBLICATIONS

Filtering the Internet: A Best Practices Model by members of the Information Society Project at Yale Law School http://www.law.yale.edu/infosociety J.M. Balkin Beth Simone Noveck Kermit Roosevelt Sep. 15, 1999.*
Filtering the Internet: A Best Practices Model by members of the Information Society Project at Yale Law School Sep. 15, 1999.*
Opinion mining and sentiment analysis Bo Pang1 and Lillian Lee2 1 Yahoo! Research, 701 First Ave. Sunnyvale, CA 94089, U.S.A., bopang@yahoo-inc.com 2 Computer Science Department, Cornell University, Ithaca, NY 14853, U.S.A., llee@cs.cornell.edu.*
"Sentry Parental Controls," Dec. 2, 2008, Market Wire, retrieved from the Internet: URL:http:/www.sentryparentalcontrols.com/Company/News.aspx?documentID=515.
Alex Wright, "Our Sentiments, Exactly," Apr. 2009, Communications of the ACM, vol. 52, No. 4.

* cited by examiner

*Primary Examiner* — Kakali Chaki
*Assistant Examiner* — Ababacar Seck
(74) *Attorney, Agent, or Firm* — Brill Law Office; Jeffrey Brill

(57) ABSTRACT

A filtering policy is defined responsive to parental directives. The filtering policy specifies to filter a child's access to content based on fact-based categorization and subjective factors, such as the emotional tone, expressed sentiment, extremity and/or expressed subjectivity. Content is categorized based on the occurrence of predefined words. A sentiment-based analysis of content is also performed. The categorization and/or analysis can occur prior to a child's attempt to download the content, or in real-time in conjunction with a download attempt. Attempts by the child to access content are detected. It is determined whether the filtering policy permits the child to access the content in question, responsive to results of the categorization and sentiment-based analysis of that content. If so, the attempted access is allowed to proceed. If not, the access attempt is blocked.

20 Claims, 4 Drawing Sheets

USING SENTIMENT-BASED ANALYSIS IN THE FILTERING OF WEB CONTENT

TECHNICAL FIELD

This disclosure pertains generally to parental control of children's computer usage, and more specifically to filtering web content based on sentimental and subjective, as well as fact-based factors.

BACKGROUND

Conventional web content filtering allows a parent or administrator to filter web content based on an attempt to match the content itself to defined categories. Particular web pages are determined to fall within given categories based on the presence of certain predetermined words or phrases thereon. For example, a page containing information about guns may be categorized as belonging to a "weapons" category, whereas another containing sexually related material would be categorized as "pornography."

Conventional content filtering solutions typically categorize web pages using a combination of automatic and manual processes. A software process called a web crawler feeds pages to a fact-based analysis engine, which assigns the pages to predefined categories by searching for words and phrases associated with those categories. Pages which are ambiguous may by flagged for a manual review, in which case a human being reviews and manually categorizes them.

Conventional web content filtering is lacking in several ways. The process of categorizing web content based on the occurrence of given words or phrases is error prone. For example, merely looking for predefined phrases/words could lead to a web page on breast self-exams being categorized as "pornography." The manual review of web pages by a person is time consuming and expensive, and can lead to the same types of misclassifications because the person is still categorizing web pages into predetermined categories based on the occurrence of specific words or phrases. This process is also ineffective in rating dynamic, user modified content, such as blogs, social networking pages and other user postings, which change quickly and can have a different focus or tone from moment to moment.

Furthermore, categorizing web pages solely based on the occurrence of predefined content is fundamentally flawed. For example, parents often wish to shield their children from viewing certain types of material, but to varying degrees based on age. The policy a parent wants to enforce is often more subtle than a simple yes or no for each of a set of predetermined categories. For example, a parent may wish to block all sexually related content from their eight year old, block all but informational content from their 13 year old, and allow all but violent or extreme content for their 17 year old. Other examples include: allowing a child to view hunting catalogs but not violent weapons sites, allowing a child to access news sites that describe violence but not gore sites, allowing a child to read historical accounts of World War Two that discusses Nazis but not hate sites, and allowing a child to access informational or medical sites concerning anorexia but not sites that promotes it. The simple granting or blocking of access based on whether a given page is determined to belong to a predetermined category does not allow these types of distinctions.

It would be desirable to address these issues.

SUMMARY

A sentiment-based filtering system enables parents to define policies for filtering children's access to web content according to sentiment-based criteria. More specifically, a filtering policy defining module defines a filtering policy responsive to directives entered by a parent. The filtering policy specifies to filter a child's access to web content based on conventional fact-based categorization of the content, as well as at least one subjective factor concerning the content, such as the emotional tone of the content, sentiment expressed by the content, the extremity of the content and/or an amount of subjectivity expressed by the content. A fact-based categorizing module categorizes web content based on occurrence of predefined words, and a sentiment-based analyzing module performs sentiment-based analysis of web content. Performing sentiment-based analysis of content can comprise classifying sentiment expressed by the content, classifying an emotional tone of the content, classifying extremity of the content and/or classifying an amount of subjectivity expressed by the content. The categorization and/or analysis can occur prior to an attempt by the child's computer to download the web content in question, or in real-time in conjunction with an attempt to download the content. Where the categorization and/or analysis occurs prior to download, the results are stored, for example in a database. A content access detecting module detects attempts by the child to access specific web content. Responsive to results of the categorization and sentiment-based analysis of the specific web content the child is attempting to access, a filtering enforcement module determines whether the filtering policy permits the child to access the specific content. If so, the filtering enforcement module allows the attempted access to proceed. If not, the filtering enforcement module blocks the access attempt.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
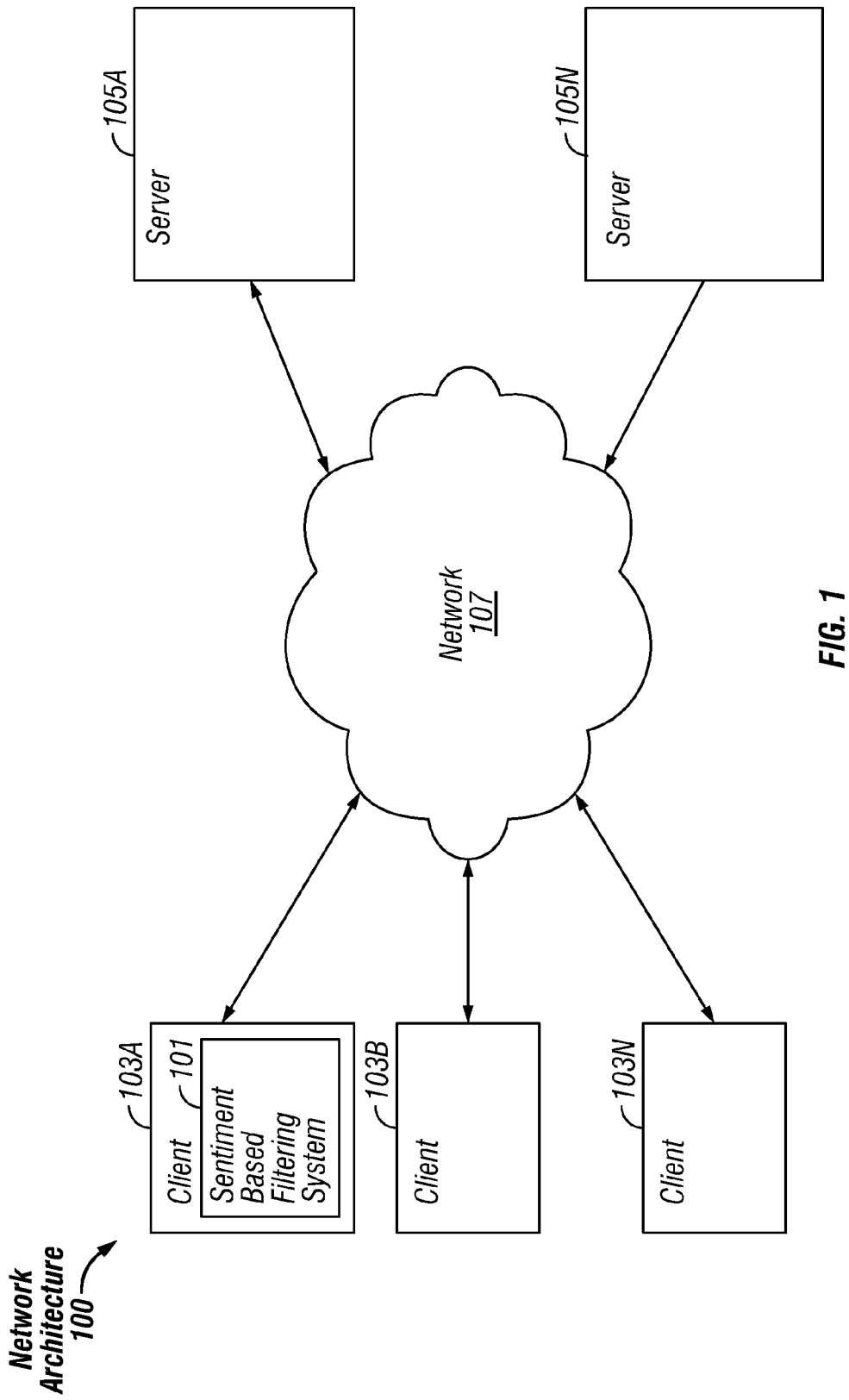
FIG. 1 is a block diagram of an exemplary network architecture in which a sentiment-based filtering system can be implemented, according to some embodiments.

FIG. 1 is a block diagram illustrating an exemplary network architecture 100 in which a sentiment-based filtering system 101 can be implemented. The illustrated network architecture 100 comprises multiple clients 103A, 103B and 103N, as well as multiple servers 105A and 105N. In FIG. 1, the sentiment-based filtering system 101 is illustrated as residing on client 103A. It is to be understood that this is an example only, and in various embodiments various functionalities of this system 101 can be instantiated on a client 103, a server 105 or otherwise distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
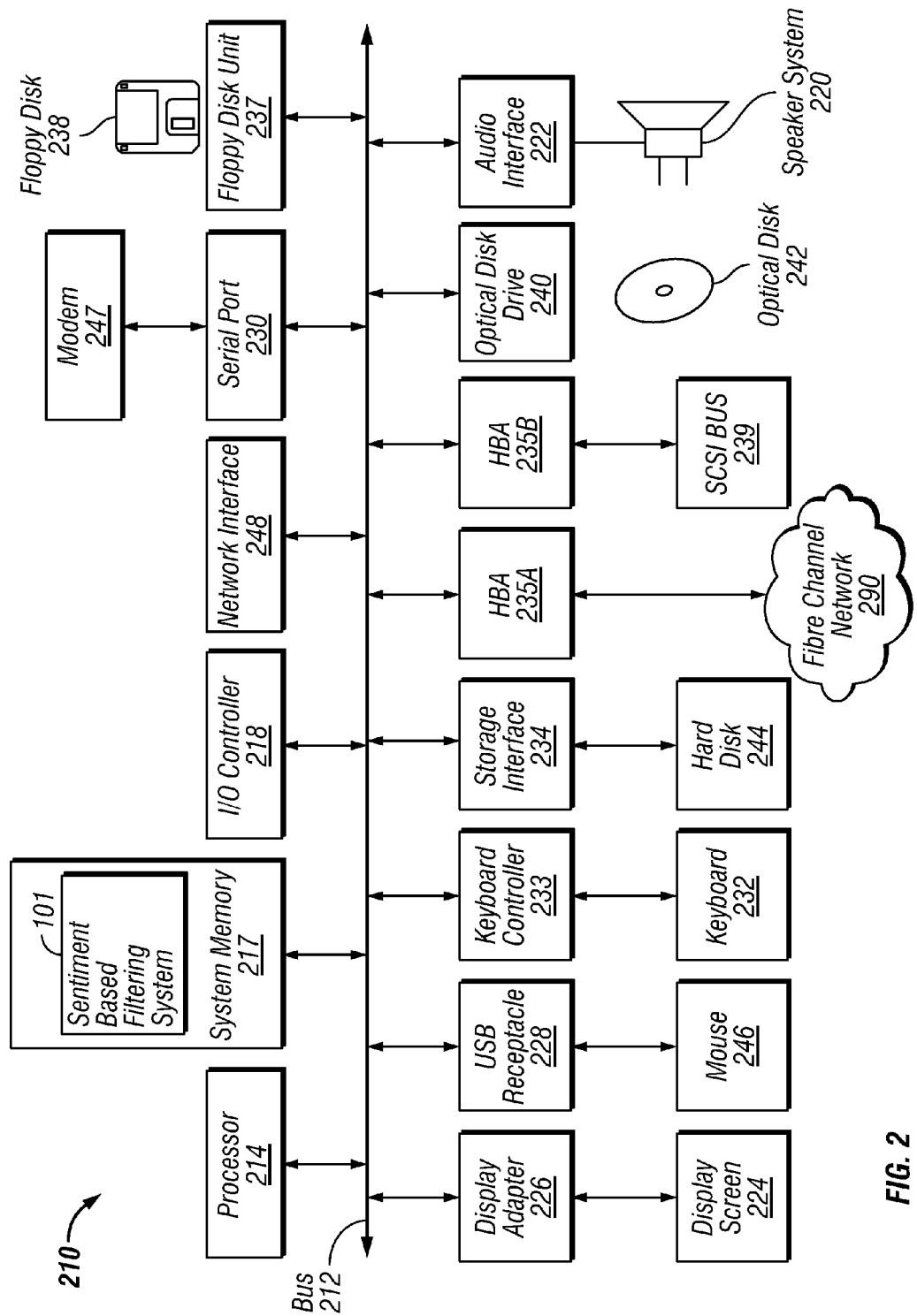
FIG. 2 is a block diagram of a computer system suitable for implementing a sentiment-based filtering system, according to some embodiments.

FIG. 2 is a block diagram of a computer system 210 suitable for implementing a sentiment-based filtering system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the sentiment-based filtering system 101 is illustrated as residing in system memory 217. The workings of the sentiment-based filtering system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
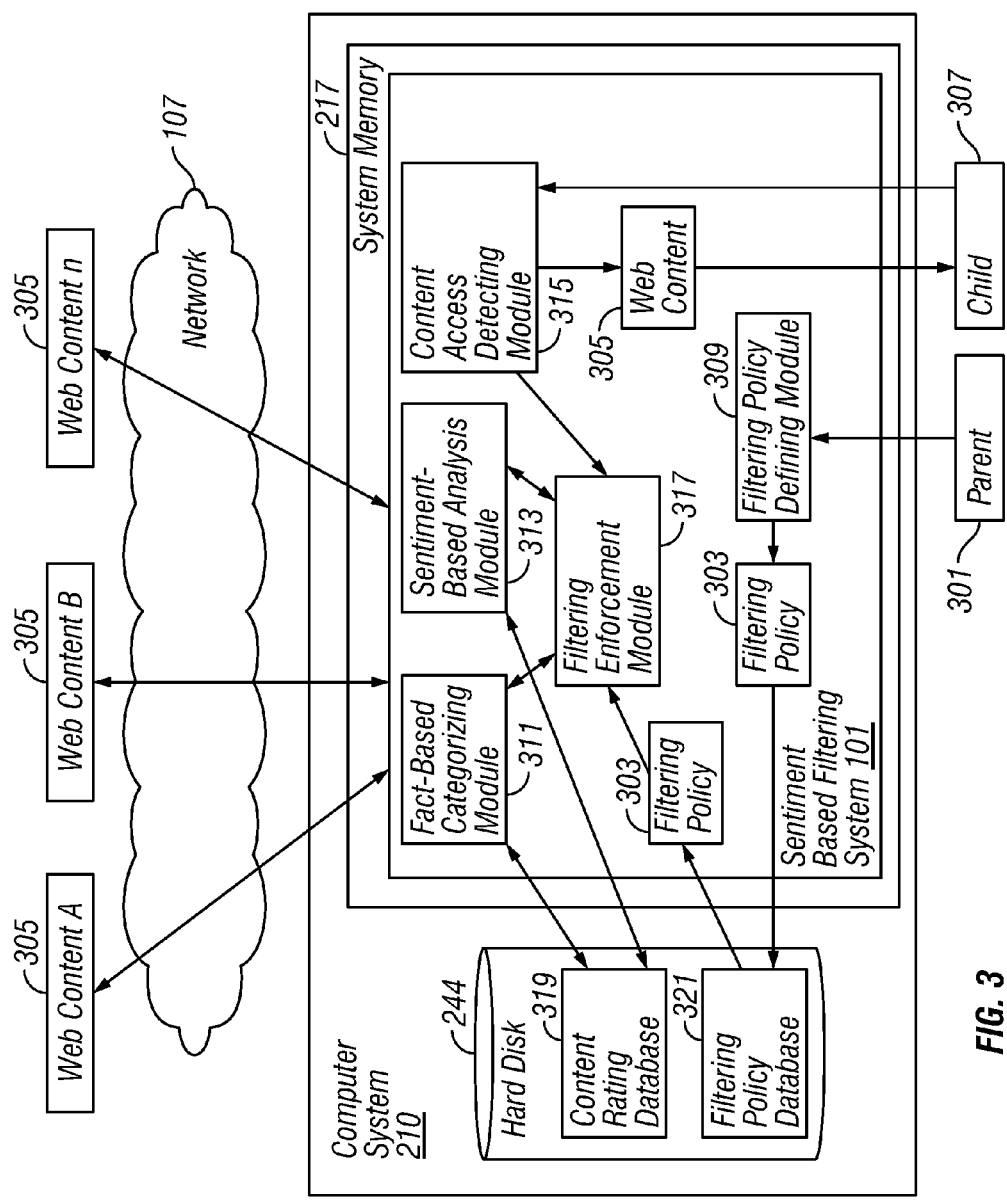
FIG. 3 is a block diagram of the operation of a sentiment-based filtering system, according to some embodiments.

FIG. 3 illustrates a sentiment-based filtering system 101, residing in the system memory 217 of a computer system 210 according to some embodiments. This sentiment-based filtering system 101 is illustrated as residing on a single computer system 210, but as described above more, fewer or different functionalities of the sentiment-based filtering system 101 can reside on a client 103, a server 105, or be otherwise distributed between multiple computer systems 210, including within a cloud-based computing environment in which the functionality of the sentiment-based filtering system 101 is provided as a service over a network 107. It is to be understood that although the sentiment-based filtering system 101 is illustrated in FIG. 3 as a single entity, the illustrated sentiment-based filtering system 101 represents a collection of functionalities, which can be instantiated as a single or multiple modules as desired (an instantiation of specific, multiple modules of the sentiment-based filtering system 101 is illustrated in FIG. 3). It is to be understood that the modules of the sentiment-based filtering system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the sentiment-based filtering system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

The sentiment-based filtering system 101 allows a parent 301 to define a filtering policy 303 for access to web content 305 by a child 307, based not only on the fact-based categorization of the content 305, but also on its expressed sentiment, subjectivity and/or extremity. As described in greater detail below, sentiment analysis can be applied to web content 305 either prior to download at the time the web content 305 is categorized, or in real-time as it is downloaded to the child's computer system 210. It is to be understood that as used herein, the term "parent" 301 means not only an actual parent, but anyone in charge of another person's access to online content 305. Thus, the term parent 301 as used herein can also apply to other adult family members and/or guardians in a home context, and/or to administrators, managers and the like in a work context. Likewise, although the term "child" 307 is used herein for readability, a child 307 herein refers to a person whose access to web content 305 is under the jurisdiction of a "parent" 301. Additionally, the term "web content" 305 is used herein for readability, but refers not only to content located on the World Wide Web, but also to other computer-readable content that a child 301 operating a local computer system 210 attempts to access from a remote computing system 210.

As illustrated in FIG. 3, the sentiment-based filtering system 101 comprises a filtering policy defining module 309, a fact-based categorizing module 311, a sentiment-based analyzing module 313, a content access detecting module 315 and a filtering enforcement module 317. The sentiment-based filtering system 101 can access a content rating database 319 and a filtering policy database 321. In other embodiments, these databases 319, 321 can be implemented as a single database and/or multiple databases and/or other appropriate storage formats. It is to be understood that in various embodiments, some or all of these databases 319, 321 can reside locally, e.g., on the same computer system 210 as the sentiment-based filtering system 101, and/or remotely, e.g., on a centrally located computer system 210 (not illustrated).

The filtering policy defining module 309 allows a parent 301 to direct the definition of a filtering policy 303 based on conventional fact-based categorizations of content 305, as well as on sentiment-based criteria. For each category of content 305 the parent 301 chooses to restrict, the parent 301 may choose to further refine the filtering policy 303 to consider the emotional tone or sentiment expressed by the content 305, the extremity of the expression and/or the amount of subjectivity expressed therein. For example, the parent 301 may choose to block web content 305 categorized as violent only if the content 305 express an angry sentiment, to block pages 305 categorized as sexual with an extreme tone and/or to block content 305 of any category that contains mostly opinion rather than fact. Parents 301 can operate the filtering policy defining module 309 via any type of conventional interface, such as a graphical user interface, configuration file, etc. The filtering policy defining module 309 can store defined filtering policies 303 in the content filtering policy database 321. It is to be understood that the level of granularity with which filtering policies 303 can be defined is a variable design parameter.

The fact-based categorizing module 311 uses conventional methodology to categorize web content 303 based on the occurrence of predefined words. The fact-based categorizing module 311 can store the results of this categorization in the content rating database 319. The sentiment-based analyzing module 313 analyzes web content 303 based on its expressed sentiment, emotional content, extremity and/or subjectivity. The sentiment-based analyzing module 313 can also store the results of this analysis in the content rating database 319.

By categorizing and analyzing web content 305 according to both fact-based criteria and sentiment, the defined filtering policy 303 can be enforced. In some embodiments, the fact-based categorizing module 311 and/or the sentiment-based analyzing module 313 perform their analysis and store the results in the content rating database 319 for future access by the filtering enforcement module 317, as described in more detail below. In other embodiments, the sentiment-based analyzing module 313 performs the sentiment analysis in real-time as the child's computer 210 attempts to access a given piece of content 305. This allows the sentiment-based analyzing module 313 to more accurately evaluate the tone of highly dynamic web content 305 such as blogs or other types of user postings, which change frequently and quickly. For example, by using real-time sentiment analysis, the sentiment-based analyzing module 313 could accurately determine that a given page or section 305 that originally contained only fact-based content was just updated to include incendiary, subjective user postings. The fact-based categorizing module 311 can also be run in real-time.

In order to perform the sentiment-based analysis of web content 305, the sentiment-based analyzing module 313 can apply any of a number of conventional sentiment analysis algorithms to the content 305. The application of such algorithms can rate or otherwise classify the sentiment, emotional tone, extremity and/or subjectivity of the content 305, for example by looking for given words associated with, e.g., anger, happiness, sadness, extremity, dogmatic points of view, subjective versus objective points of view, etc.

In order to enforce a parentally defined filtering policy 303, the filtering enforcement module 317 accesses the filtering policy 303 that is in force (e.g., by retrieving the filtering policy 303 from the filtering policy database 321). The content access detecting module 315 detects attempts by the child 307 to access web content. The implementation mechanics for detecting attempts to access web content 305 by a given computer system 210 are conventional in nature, and the use thereof within this context will be readily apparent to one of ordinary skill in the relevant art in light of this disclosure.

When the child 301 attempts to access web content 305, the content access detecting module 315 calls the filtering enforcement module 317 to enforce the filtering policy 303. In one embodiment, prior to downloading a given unit of web content 305 (e.g., a web page or portion thereof), the filtering enforcement module 317 retrieves fact-based categorization information and/or sentiment-based analysis information concerning that content 305 from the content rating database 319. Note that in this embodiment, the retrieved information has been previously generated by the sentiment-based analyzing module 313 and/or the fact-based categorizing module 311. In this embodiment, if no information of a given type is found in the content rating database 319, the filtering enforcement module 317 can call the sentiment-based analyzing module 313 and/or the fact-based categorizing module 311 to analyze and/or categorize the content 305, and to store the resulting information in the content rating database 319. In another embodiment, the filtering enforcement module 317 calls one or both of these modules 311, 313 in real-time to determine up-to-date information concerning the content 305 in question. In either case, once the filtering enforcement module 317 has sentiment and fact-based information concerning the content 305, it determines whether the filtering policy 303 permits the child 307 to access the content 305. The filtering enforcement module 317 enforces the filtering policy 303, for example by blocking or allowing the access to the content 305 as the filtering policy 303 specifies.

Figure 4:
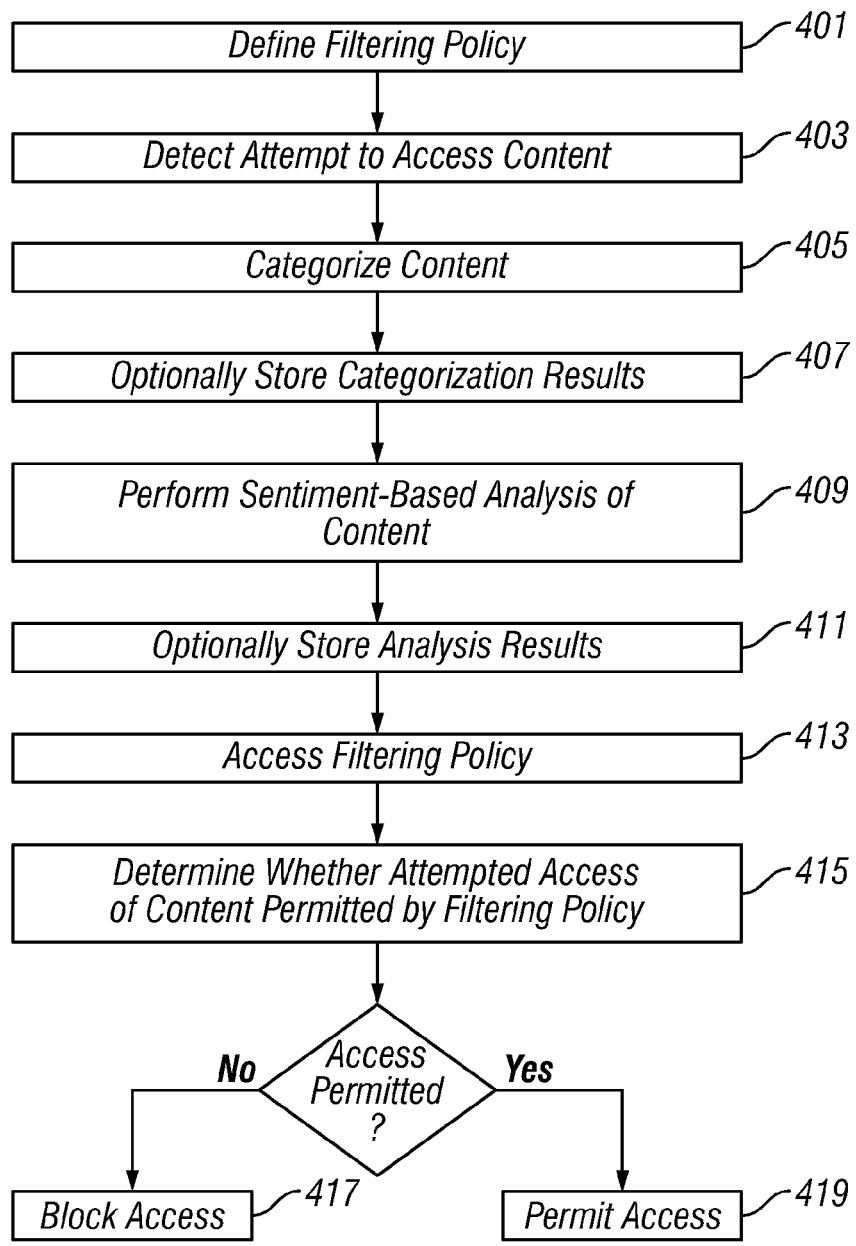
FIG. 4 is a flowchart illustrating steps for the operation of a sentiment-based filtering system, according to some embodiments.

FIG. 4 illustrates steps for the operation of the sentiment-based filtering system 101 (FIG. 1), according to some embodiments. The filtering policy defining module 309 (FIG. 3) is directed by a parent 301 (FIG. 3) to define 401 a filtering policy 303 (FIG. 3) for access of web content 305 (FIG. 3) by a child 307 (FIG. 3). The defined filtering policy 303 (FIG. 3) is based on both conventional fact-based criteria and sentiment-based criteria. An attempt by the child's computer system 210 (FIG. 2) to access web content 305 (FIG. 3) is detected 403 by the content access detecting module 315 (FIG. 3). The fact-based categorizing module 311 (FIG. 3) categorizes 405 the web content 303 (FIG. 3) based on the occurrence of predefined words, and optionally stores 407 the results of this categorization in the content rating database 319 (FIG. 3). The sentiment-based analyzing module 313 (FIG. 3) analyzes 409 the web content based on its expressed sentiment, emotional content, extremity and/or subjectivity.

The sentiment-based analyzing module 313 (FIG. 3) can also optionally store 411 the results of this analysis in the content rating database 319 (FIG. 3).

The filtering enforcement module 317 (FIG. 3) accesses 413 the filtering policy 303 (FIG. 3), and determines 415 whether the web content 305 (FIG. 3) the child's computer system 210 (FIG. 2) is attempting to access is permitted by the filtering policy 303 (FIG. 3). If not, the filtering enforcement module 317 (FIG. 3) blocks 417 the access. If so, the filtering enforcement module 317 (FIG. 3) allows 419 the access of the content 305 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for using sentiment-based analysis in content access, the method comprising the steps of:
    receiving a filtering policy by a computer, the received filtering policy specifying to filter a protected party's access to content based on fact-based categorization of content and subjective factors concerning content, wherein granularity of said filtering policy is variable by use of one or more of a plurality of combinations of fact-based categorization and subjective factors, wherein the protected party is being administered by a third party;
    detecting, by a computer, an attempt by the protected party to access specific content, the specific content being remotely located;
    categorizing, by a computer, the specific content based on occurrence of predefined words responsive to the access attempt;
    performing, by a computer, a sentiment-based analysis of the specific content responsive to the access attempt;
    responsive to results of the categorization in light of the sentiment-based analysis of the specific content, determining, by a computer, whether the filtering policy permits the protected party to access the specific content;
    responsive to results of the determining step, managing, by a computer, the attempted access of the specific content by the protected party.

2. The method of claim 1 wherein receiving a filtering policy by a computer further comprises:
    receiving, by a computer, direction from a protecting party for defining a filtering policy specifying to filter a protected party's access to content based on fact-based categorization of content and subjective factors concerning content; and
    responsive to the received direction, defining, by a computer, a filtering policy specifying to filter a protected party's access to content based on at least one of a plurality of combinations of fact-based categorization of content and subjective factors concerning content.

3. The method of claim 1 wherein the subjective factors concerning content comprise an emotional tone of the content.

4. The method of claim 1 wherein the subjective factors concerning content comprise sentiment expressed by the content.

5. The method of claim 1 wherein the subjective factors concerning content comprise extremity of the content.

6. The method of claim 1 wherein the subjective factors concerning content comprise an amount of subjectivity expressed by the content.

7. The method of claim 1 wherein categorizing, by a computer, the specific content based on occurrence of predefined words further comprises:
    categorizing, by a computer, the specific content based on occurrence of predefined words prior to an attempt by the protected party to download the specific content; and
    storing the results of the categorizing, by a computer.

8. The method of claim 1 wherein categorizing, by a computer, the specific content based on occurrence of predefined words further comprises:
    categorizing, by a computer, the specific content based on occurrence of predefined words in real-time in conjunction with an attempt by the protected party to download the specific content.

9. The method of claim 1 wherein performing, by a computer, a sentiment-based analysis of the specific content further comprises:
    performing, by a computer, a sentiment-based analysis of the specific content prior to an attempt by the protected party to download the specific content; and
    storing the results of the analyzing, by a computer.

10. The method of claim 1 wherein performing, by a computer, a sentiment-based analysis of the specific content further comprises:
    performing, by a computer, a sentiment-based analysis of the specific content in real-time in conjunction with an attempt by the protected party to download the specific content.

11. The method of claim 1 wherein performing, by a computer, a sentiment-based analysis of the specific content further comprises:
    classifying, by a computer, sentiment expressed by the specific content.

12. The method of claim 1 wherein performing, by a computer, a sentiment-based analysis of the specific content further comprises:
    classifying, by a computer, an emotional tone of the specific content.

13. The method of claim 1 wherein performing, by a computer, a sentiment-based analysis of the specific content further comprises:
    classifying, by a computer, extremity of the specific content.

14. The method of claim 1 wherein performing, by a computer, a sentiment-based analysis of the specific content further comprises:
    classifying, by a computer, an amount of subjectivity expressed by the specific content.

15. The method of claim 1 wherein managing, by a computer, the attempted access of the specific content by the protected party responsive to results of the determining step, further comprises:

responsive to determining that the filtering policy permits the protected party to access the specific content, allowing, by a computer, the protected party to access the specific content.

16. The method of claim 1 wherein managing, by a computer, the attempted access of the specific content by the protected party responsive to results of the determining step, further comprises:

responsive to determining that the filtering policy forbids the protected party from accessing the specific content, blocking, by a computer, the protected party from accessing the specific content.

17. At least one non-transitory computer readable storage medium storing a computer program product for using sentiment-based analysis in content access, the computer program product comprising:

program code for receiving a filtering policy by a computer, the received filtering policy specifying to filter a protected party's access to content based on fact-based categorization of content and subjective factors concerning content, wherein granularity of said filtering policy is variable by use of one or more of a plurality of combinations of fact-based categorization and subjective factors, wherein the protected party is being administered by a third party;

program code for detecting an attempt by the protected party to access specific content, the specific content being remotely located;

program code for categorizing the specific content based on occurrence of predefined words responsive to the access attempt;

program code for performing a sentiment-based analysis of the specific content responsive to the access attempt;

program code for, responsive to results of the categorization in light of the sentiment-based analysis of the specific content, determining whether the filtering policy permits the protected party to access the specific content;

program code for, responsive to determining that the filtering policy permits the protected party to access the specific content, allowing the protected party to access the specific content; and program code for, responsive to determining that the filtering policy forbids the protected party from accessing the specific content, blocking the protected party from accessing the specific content.

18. The method of claim 1 wherein the program code for performing a sentiment-based analysis of the specific content further comprises program code for performing at least one step from a group of steps consisting of:

performing a sentiment-based analysis of the specific content prior to an attempt by the protected party to download the specific content, and storing the results of the analyzing; and performing a sentiment-based analysis of the specific content in real-time in conjunction with an attempt by the protected party to download the specific content.

19. The method of claim 1 wherein the program code for performing a sentiment-based analysis of the specific content further comprises program code for performing at least one step from a group of steps consisting of:

classifying sentiment expressed by the specific content;
classifying an emotional tone of the specific content;
classifying extremity of the specific content; and
classifying an amount of subjectivity expressed by the specific content.

20. A computer system configured to use sentiment-based analysis in content access, the computer system comprising:

a processor;
a system memory;
means for receiving a filtering policy, the received filtering policy specifying to filter a protected party's access to content based on fact-based categorization of content and subjective factors concerning content, wherein granularity of said filtering policy is variable by use of one or more of a plurality of combinations of fact-based categorization and subjective factors, wherein the protected party is being administered by a third party;
means for detecting an attempt by the protected party to access specific content, the specific content being remotely located;
means for categorizing the specific content based on occurrence of predefined words responsive to the access attempt;
means for performing a sentiment-based analysis of the specific content responsive to the access attempt;
means for, responsive to results of the categorization in light of the sentiment-based analysis of the specific content, determining whether the filtering policy permits the protected party to access the specific content;
means for, responsive to determining that the filtering policy permits the protected party to access the specific content, allowing the protected party to access the specific content; and
means for, responsive to determining that the filtering policy forbids the protected party from accessing the specific content, blocking the protected party from accessing the specific content.

* * * * *